United States Patent [19]

White

[11] 4,275,452
[45] Jun. 23, 1981

[54] SIMPLIFIED FAST FOURIER TRANSFORM BUTTERFLY ARITHMETIC UNIT

[75] Inventor: Stanley A. White, Santa Ana, Calif.

[73] Assignee: Rockwell International Corporation, El Segundo, Calif.

[21] Appl. No.: 92,387

[22] Filed: Nov. 8, 1979

[51] Int. Cl.³ .................... G06F 15/332; G06F 7/54
[52] U.S. Cl. .................................... 364/726; 364/759
[58] Field of Search ............... 364/726, 754, 757, 759

[56] References Cited

U.S. PATENT DOCUMENTS

| | | | |
|---|---|---|---|
| 3,588,460 | 6/1971 | Smith | 364/726 |
| 3,673,399 | 6/1972 | Hancke et al. | 364/726 |
| 3,800,130 | 3/1974 | Martinson et al. | 364/726 |
| 3,926,367 | 12/1975 | Bond et al. | 364/754 X |

*Primary Examiner*—David H. Malzahn

*Attorney, Agent, or Firm*—H. Fredrick Hamann; Rolf M. Pitts

[57] ABSTRACT

An improved organization for a FFT analyzer (or periodic function analyzer) having a reduced computing complexity. A modified organization comprises a simplified butterfly arithmetic unit in which the usual two coefficient registers or memories are required. By utilizing the registers as sources of a respective sum of and difference between sets of phase-shifted cosine values, the mechanization of the complex multiplier for such arithmetic butterfly unit in microcircuit or "chip" form may be further simplified to two controllable accumulators controlled by an exclusive-NOR gate logic system responsive to the states of the complex sampled inputs of a sampled signal epoch of interest. In this way, a more efficient and higher speed device is provided for the multiplication of complex variables.

9 Claims, 9 Drawing Figures

SIMPLIFIED FAST FOURIER TRANSFORM BUTTERFLY ARITHMETIC UNIT

The invention herein described was made in the course of or under a contract or subcontract thereunder with the Department of the Army.

CO-PENDING APPLICATIONS

1. U.S. Patent Application Ser. No. 960,813, filed Nov. 15, 1978, by T. Chang et al for NON-FINGERPRINT REGION INDICATOR now issued as U.S. Pat. No. 4,225,850.

BACKGROUND OF THE INVENTION

1. Field of Invention

The concept of the invention relates to an improved, special purpose data processor or hard wired type or microprogrammed microprocessor-based fast fourier transform (or other periodic function) analyzer.

2. Description of the Prior Art

In the field of data processing by digital machine means, the analysis of the periodic function properties of data specimens is frequently required. Such data may be in the form of binary-coded image signals corresponding to an image field pattern of interest, while the occurrence therein of selected bandwidths of spatial frequencies may correspond to (or identify) preselected features of interest in such image field pattern. Use of a two-dimensional generalized sequency analyzer, such as a fast fourier transform (2D-FFT) machine or the like may be employed for an automatic machine method of such identification, as described in co-pending U.S. Application Ser. No. 960,813, filed Nov. 15, 1978, (now U.S. Pat. No. 4,225,850) entitled NON-FINGERPRINT REGION INDICATOR and assigned to Rockwell International Corporation, assignee of the subject application. Such prior art machines for performing such operation of generalized sequency operation or fast fourier transform determination have generally been suitably programmed general purpose machines such as the IBM 7094, Burroughs B5500, CDC 6400 and CDC 6600 type machines, as described more fully in the above-noted co-pending U.S. Application Ser. No. 960,813, filed Nov. 15, 1978. Such large-scale machines have adequate computing capacity and speed to perform the fast fourier transform, when appropriately programmed with a suitable algorithm as indicated in the volume, *Digital Data Processing*, edited by Rabiner and Rader, published by the IEEE press (1972). Such commercially available machines are, however, too large, expensive and impractical to use in the special purpose data processing and control applications which require to be dedicated to such generalized sequency analysis, such as the fast fourier transform. The initial cost of acquisition and continuing maintenance costs of such general purpose machines are all out of proportion to the limited computational employment to be made thereof in a dedicated or special purpose application of generalized sequency analysis, while the bulk of such machines precludes their installation in the limited accommodations generally available for such special purpose application, including mobile accommodations. Further, although such bulk, complexity and associated costs are deplored, yet the classical algorithms employed in implementing such applications have limited the use of smaller machines including special purpose machines dedicated to or especially adapted for performing the fast fourier transform. An example of a special purpose analog machine for both calculation of a signal (and also the frequency domain equalization of such signal) is taught in U.S. Pat. No. 4,106,103 to Perrault for DEVIATION OF DISCRETE FOURIER TRANSFORM COMPONENTS OF A TIME DEPENDENT SIGNAL.

In the digital fast fourier processing of sampled time history of say N samples over the sampled signal epoch of interest, successive samples are treated as complex quantities and are organized as two groups of sequences, each occurring in a mutually exclusive one of a first half and second half (A and B) of the sampled epoch. As is more fully explained in U.S. Pat. No. 4,158,888 to Shapiro for FAST FOURIER TRANSFORM PROCESSOR USING SERIAL PROCESSING AND DECODER ARITHMETIC AND CONTROL SECTION, the FFT processor may be characterized as a digital processor which repetitively performs the basic computations $AW+B$ and $AW-B$, where A and B are complex digital words, each corresponding to a different one of N digital samples to be analyzed, and W is a complex digital word corresponding to a weighting function. Mechanization involves use of a scalar multiplier to provide components of the complex product AW, storage means to store such product, and an adder/subtractor for combining such stored product to generate the complex product AW and to combine this complex product with the components of the complex variable B.

Detailed arithmetic processing of the sequential computations in a sequency analyzer of FFT machine, as a practical matter, involves reorganizing the discrete fourier transform data matrix into submatrices, each of which requires simpler arithmetic operations, and the results of which simpler operations may be merely simply combined, rather than multiplied. Such reorganization process is referred to generically as decimation, the two classical methods of reorganizing the data matrix being referred to as decimation-in-frequency and decimation-in-time. The basic resultant computational operation is called a "butterfly".

What is desired is a hard wired special purpose machine for performing the butterfly computation in a yet more efficient manner, as to involve still fewer steps and arithmetical sequences, as to also be smaller, less complex, less costly and more reliable.

The above-noted U.S. Pat. No. 4,158,888 to Shapiro is addressed to the decimation-in-time technique, and employs a serial-parallel multiplier for providing the product AW and a data decoder 68 for effecting the decimation-in-time butterfly which is to generate the combination $A+=AW+B$ and $B+=AW-B$ where these quantities are complex variables, By means of response to a sequence of clock control signals, a decoder section 60 (which includes data decoder 68) serves to control the performance of a serial-parallel multiplier in cooperation with a random access memory.

By means of serial storage and retrieval of the scaled signals AW in response to a sequence of clock-control signals, a simplified data decoder may be thus employed to effect both the combination of AW and B, as well as to perform other functions. In other words, the decimate-in-time type system of Shapiro employs a clock control element 52 (in Shapiro's FIG. 5) to effect mode control of multi-mode or time-shared computing elements in cooperation with a random access memory (RAM) to perform all the classical calculations shown in Table 8 of such reference.

Such mechanization of Shapiro, employing serial storage and retrieval of signals to be scaled via a classical serial-parallel multiplier to effect the product AW, and further employing a data decoder and shift register (as a serial adder function) to algebraically combine the terms AW and B, further involves serial storage and retrieval of all of his data as to require a substantial processing time:

$2[3[M+N-1]+(N+1)]$ bits where:

M = number of bits per input to multiplier 72 from multiplier coefficient decoder 64

N = number of bits per input to multiplier 72 from multiplier control decoder 66

(M+N-1) = number of bits of product formation (AW) time from the output of multiplier 72

(N+1) = number of bits to form $B_R$ or $B_I$

3 = number of passes through the Butterfly or calculation repetitions $3[M+N-1]+(N+1)$ = number of bit times to form either the real or imaginary component of AW $2[3[M+N-1]+(N+1)]$ = the number of bit times to form the complex sum AW+B.

Thus, while Shapiro teaches a FFT analyzer for application to real time processing of doppler data, the inherent speed limitation of such serial data storage and retrieval type of processing ultimately limits the number of discrete frequencies which can be handled by a given machine as to represent a limitation in either bandwidth or resolution, or at least a trade-off between them.

SUMMARY OF THE INVENTION

By means of the concept of the invention there is provided dedicated machine means for overcoming the above-noted limitation of the prior art and for more efficiently performing a butterfly computation analysis. Such machine means embodies a unique modification of the classical FFT "butterfly" mechanizations to effectively provide a practical hardwired machine requiring a perform fewer arithmetic operations, as to involve a reduction in the mechanization and an increase in computational speed. Such mechanization efficiency is available to both decimation-in-time and decimation-in-frequency type mechanizations.

In a preferred embodiment of the invention there is provided a generalized sequency analyzer such as a fast fourier transform analyzer, including simplified FFT butterfly arithmetic means. Each such simplified arithmetic unit is comprised of memory means such as a pair of registers for storing the respective sum $(W_R+W_I)$ and difference $(W_R-W_I)$ of $W_R$ and $W_I$, components of the complex-butterfly twiddle factor, (or weighting factor), W, as phase shifted cosine values. Storing the complex factor in such form allows the use of as few as two accumulating registers, each having selectively controllable add and subtract modes of operation and being selectively responsive to an alternate one of the stored sum and difference of the twiddle factor components.

The classical assignment of such term, twiddle factor, is to be noted from the literature, in Section 3.2 at page 145 and in Section 5.6 at page 227 in the text "Digital Signal Processing" by Peled and Liu, published by John Wiley and Sons, New York (1976).

Exclusive NOR type logic means, adapted to be responsive to preselected state conditions of the sampled epoch input to the butterfly arithmetic unit, control the pair of accumulating registers to effect the complex weighted butterfly output function $(y=y_R+jy_I)$ as a function of the applied sums and differences of the components of the complex twiddle factor, W.

By means of the above described arrangement for controlled switching of two accumulators, responsive to alternate ones of the sums and differences of the components of the complex (FFT) twiddle factor, the complex variable y=Wz may be generated very simply and without the necessity of discrete multipliers. By employing a set of phase shifted cosine values for the FFT coefficient and mechanizing the value of z as a fractional N-bit number in 2's complement notation, in the manner of the invention, analysis by a set of butterfly computational units may be affected of a signal whose bandwidth exceeds the clock frequency of the analyzer "chip" or microprocessor circuit.

Accordingly, it is an object of the invention to provide an improved arrangement for a fast fourier transform analyzer or the like.

It is another object to provide a simplified FFT butterfly arithmetic unit.

Another object is to simplify the mechanizations of both decimate-in-frequency and decimate-in-time type FFT machines.

Still another object is to provide an FFT butterfly arithmetic unit having an improved performance ratio of maximum signal bandwidth to clock frequency.

Yet another object is to provide a simplified FFT device capable of being reduced to a LSI chip having fewer chip leads and connectors.

These and other objects will become apparent from the following description, taken together with the accompanying drawings in which:

BRIEF DESCRIPTION OF THE DRAWINGS

In the figures, like reference characters refer to like parts.

DESCRIPTION OF THE PREFERRED EMBODIMENTS

Figure 1:
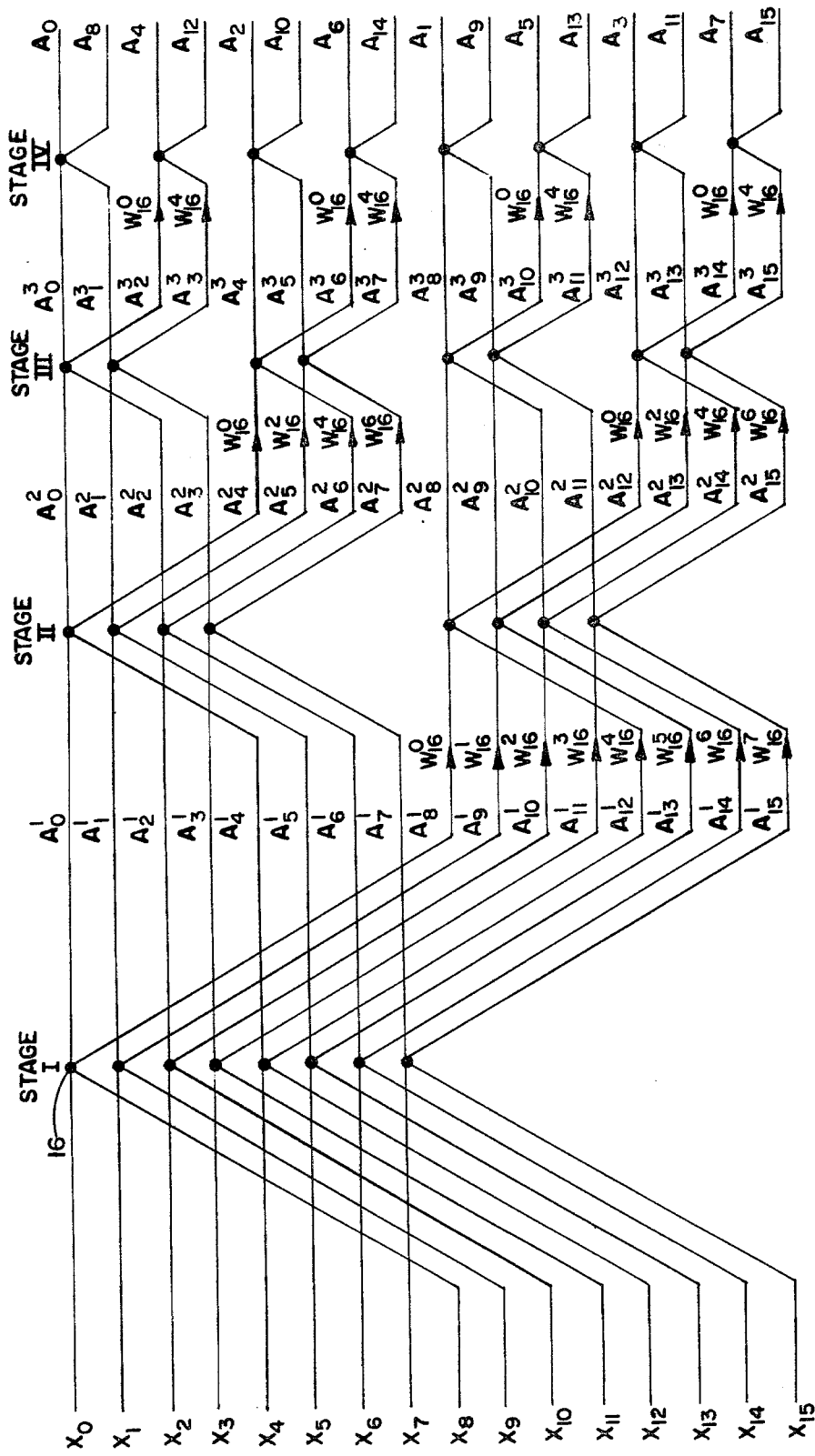
FIG. 1 is a diagram of a exemplary 16 point radix-2 decimation-in-frequency fast fourier transform (FFT) in which the concept of the invention may be advantageously employed.

Referring now to FIG. 1, there is illustrated a diagram of an exemplary 16-point radix 2 decimation-in-frequency fast fourier transform (FFT) analyzer in which the concept of the invention may be advantageously employed. FIG. 1 is taken from Peled and Liu, FIG. 3.5, page 153.

Figure 3:
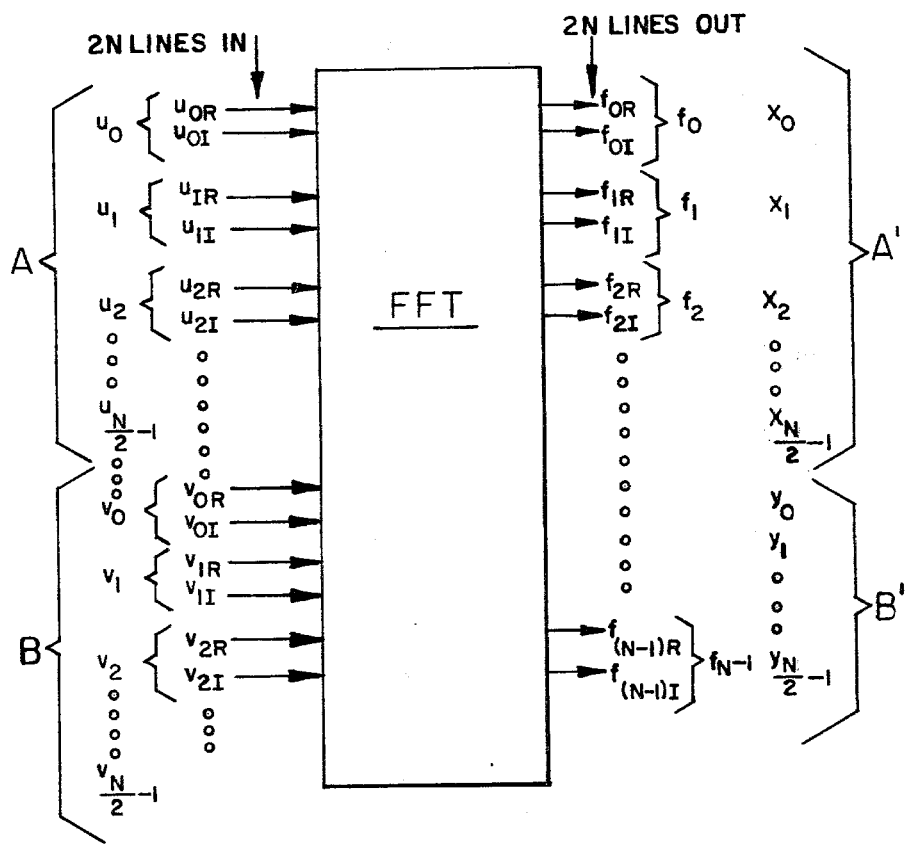
FIG. 3 is a simplified block diagram of the device of FIG. 1, illustrating the forms of the inputs and outputs thereof, and the manner of applying said inputs.

Such 16-point FFT structure is seen to be comprised of 16 inputs ($X_0$–$X_{15}$), representing the batch sample or epoch of a sampled time history-to-be-analyzed, consisting of 16 successive samples: each of the inputs $X_0$–$X_7$ is identified as a successive one of the samples $u_0, u_1, \ldots u_{(N/2)-1}$ of the first half of the sampled epoch, and each of inputs $X_8$–$X_{15}$ is identified as a successive one of the samples $v_0, v_1, \ldots v_{(N/2)-1}$ of the second half of the sampled epoch, as shown in FIG. 3. Such samples may be obtained by coherent detection, as shown in the above-noted reference in U.S. Pat. No. 4,158,888 to Shapiro, to preserve the phase data as well as the amplitude data of such sample. In other words, the values for the samples u and v are complex numbers $u = u_R + ju_I$, $v = v_R + jv_I$.

Figure 5:
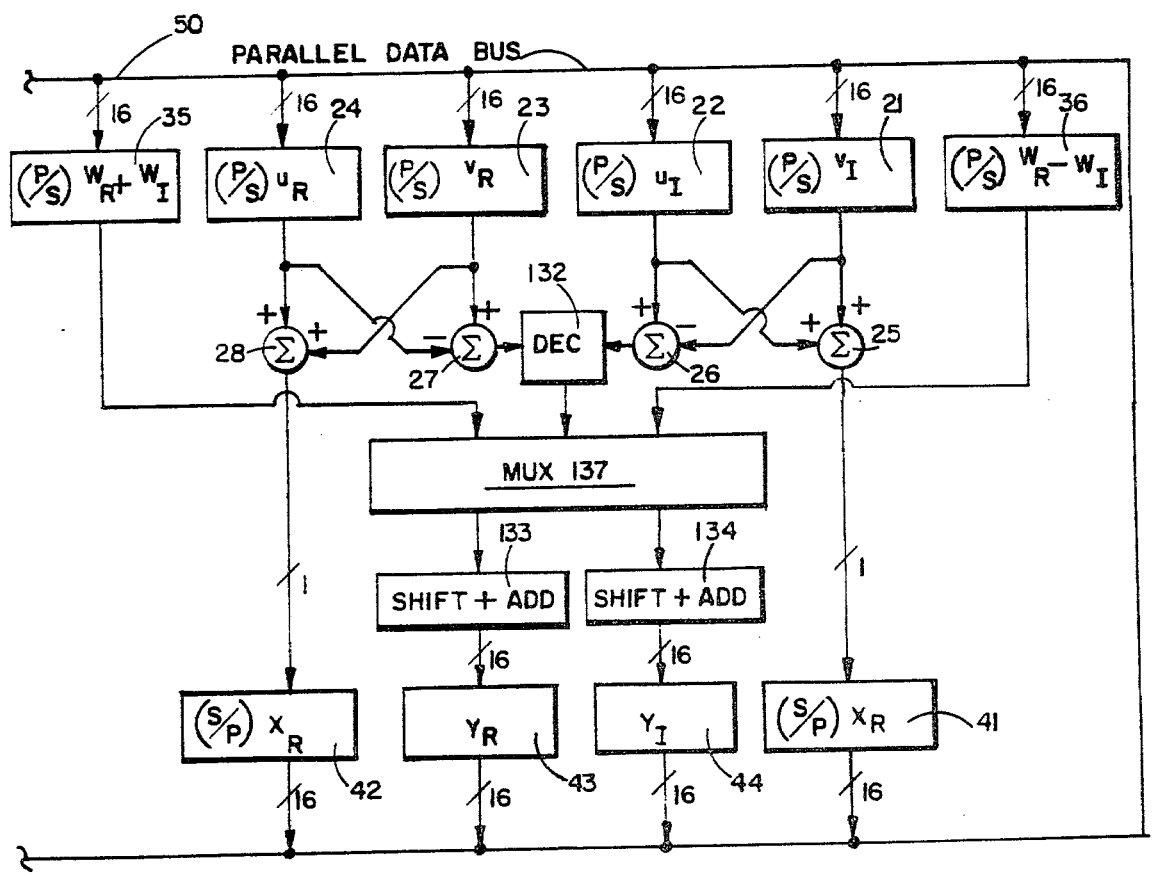
FIG. 5 is a further embodiment of the device of FIG. 4 and employing a multiplexed common data bus and depicting the use of serial-to-parallel (s/p) and parallel-to-serial (p/s) registers in implementing the bus-type mechanization.

The output of the 16 point FFT structure of FIG. 1 represents the complex coefficients for 16 discrete frequencies, each coefficient represented by a pair of so-called real and imaginary components, as to describe the amplitude and phase of such discrete spectral component, as shown schematically in FIGS. 3 and 5.

As is well understood in the art, the process of computing the fast fourier transform is a repetitive one of algebraic combination and complex multiplication of corresponding samples of each half-epoch. For example, the first sample $u_0$ (on terminal $X_0$) of the first half of the sampled epoch is combined with first sample $v_0$ (on terminal $X_8$) of the second half of the epoch, which operator is indicated by node 16 in the first stage of FIG. 1 and shown more particularly in FIG. 2. The results of such algebraic combination appear on branches $A_0^1$ and $A_8^1$ in FIG. 1 after passing through the $W_{16}^0$ multiplier, and are indicated as the variables x and y in FIG. 2.

Figure 2:
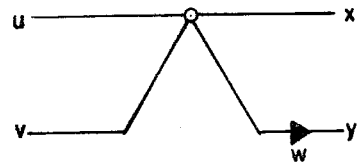
FIG. 2 is a diagram of a single FFT "butterfly" of FIG. 1, showing the complex signal processing by means of the complex twiddle factor W.

Referring now to FIG. 2, the complex inputs $u = u_R + u_I$ and $v = v_R + V_I$ (for terminals $X_0$ and $X_8$, respectively, in FIG. 1) are algebraically combined as follows:

$$
\begin{aligned}
x &= u + v & (1) \\
x &= (u_R + v_R) + j(u_I + v_I) & (2) \\
x &= x_R + jx_I & (2a) \\
z &= u - v & (3) \\
z &= (u_R - v_R) + j(u_I - v_I) & (4) \\
z &= z_R + jz_I & (5) \\
y &= wz = (w_R + jw_I)(z_R + jz_I) & (6) \\
y &= y_R + jy_I & (7)
\end{aligned}
$$

Where w = the FFT twiddle factor.

The complex number $w = e^{-j\theta} = w_R + jw_I$ may be represented as $\cos\theta - j\sin\theta$. For the first butterfly computation in FIG. 1, the specific twiddle factor is represented by $w_{16}^0 = 1$.

In the process represented by FIG. 1, the butterfly computation is similarly performed for successive data sets or butterflies of Stage I in FIG. 1. The outputs of Stage I are then employed in organizing subsets of butterflies in successive stages or repetitions of the butterfly arithmetic operation. For example, in Stage II, the successive terms of Stage I algebraic addition, $x = u + v$, on lines $A_0^1$–$A_7^1$ are employed to create a first subset of four Stage II butterflies, and the successive terms of Stage I algebraic subtraction (and complex multiplication by w), $y = wz = w(u - v)$, on lines $A_8^1$–$A_{15}^1$, are used to form a second subset of four butterflies, as to complete Stage II. The outputs of each of the two subsets of Stage II are similarly organized to produce the subsets of Stage III of the four stages illustrated in FIG. 1.

As has been demonstrated in the prior art, for a P-point transform, there are P/2 butterflies per stage and $\log_2 P$ stages. Thus, the 16-point transform in FIG. 1 shows 16/2 or 8 butterflies per stage and $\log_2(16) = 4$ stages.

From the above-noted text by Peled and Liu (at page 33) it is noted that the weighting function or twiddle $w_N$ for a fast fourier transform of a given number (N) of points is:

$$(W_N)^{pn} = e^{-2j\pi pn/N}$$

where
j = complex operator
p = a discrete frequency of interest
n = a sample of interest within the sampled epoch.

Figure 4:
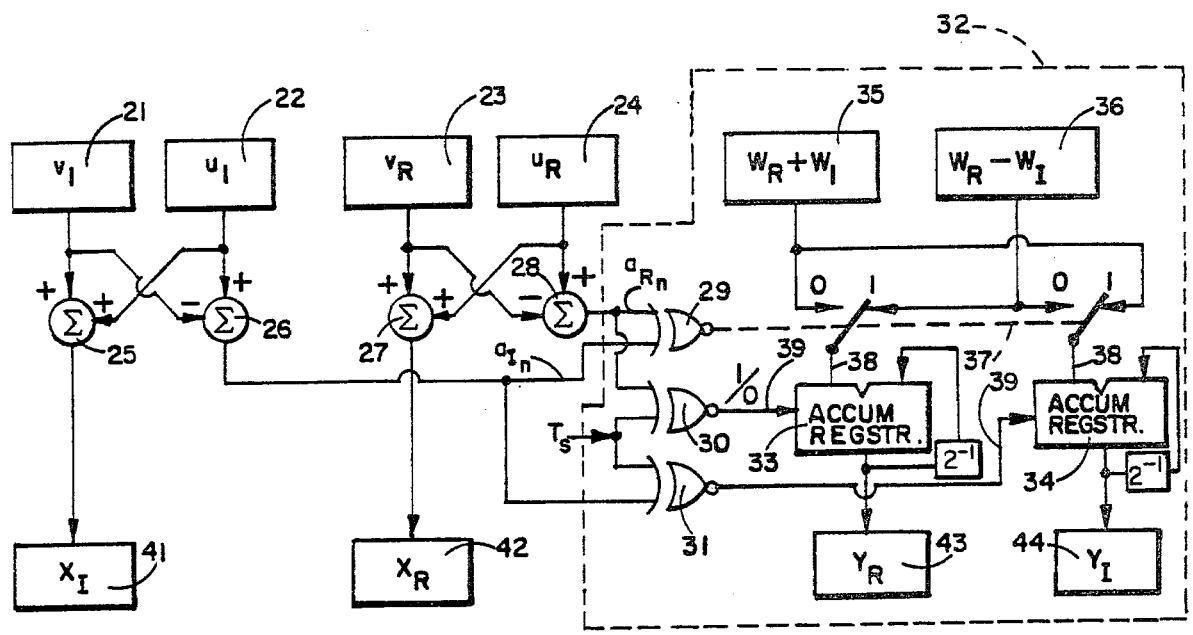
FIG. 4 is a functional block diagram of the improved organization provided by the invention for the decimation-in-frequency type FFT butterfly arithmetic unit of FIG. 2.

In the notation employed in exposition of the present invention, the following alternative twiddle factor notation is employed:

$$w = e^{-2\pi ji/P} = e^{-j\theta}$$

where
P = the number of points (i.e., N of Peled and Liu)
i = a discrete frequency of interest
$w = w_R + jw_I = e^{-2\pi i/P}$, a phasor The computational process represented by FIG. 1 and illustrated more particularly in FIG. 2, in which the twiddle factor w is applied to the second output leg, $y = wz$, after the process of algebraic subtraction $z = u - v$, in all but the final stage, is referred to in the art as decimation-in-frequency. An alternate computational process, in which a twiddle factor or weighting factor is applied to an input to the butterfly, as illustrated in FIG. 4 of the above-noted U.S. Pat. No. 4,158,888 to Shapiro, which alternate scheme is referred to as decimation-in-time. A further example for an eight-point decimation-in-time FET is shown in FIG. 3.3 at page 148 of the above-noted text by Peled and Liu.

In considering the mechanization of the decimation-in-frequency process of FIGS. 1 and 2 and represented by Equations (1)–(7), further consideration is made of Equations (4), (5) and (6) for the output variable, z. Each component, $z_R$ and $z_I$, of $z = z_R + jz_I$, can be expressed as a fractional N-bit number in 2's complement notation, a sign bit and N-1 amplitude bits, as follows:

$$z_R = -a_{R0} + \sum_{n=1}^{N-1} a_{Rn} 2^{-n} \quad (8)$$

and $$z_I = -a_{I0} + \sum_{n=1}^{N-1} a_{In} 2^{-n} \quad (9)$$

where
N = the word size (i.e., number of bits)
n = an index

In such format, the first term (i.e., $-a_{R0}$ or $-a_{I0}$) is the sign bit and the second term corresponds to the magnitude of the scalar value, $z_R$ or $z_I$. The coefficient $a_{Rn}$ or $a_{In}$ represents a data bit in a serial data word line.

Now, for convenience, the term $z_R$ may be expanded as follows:

$$z_R = \tfrac{1}{2} z_R - \tfrac{1}{2}(-z_R) \tag{10}$$

Such expansion (referred to in the art as the Büttner-Schüssler identity) may then be employed in a subsequent expansion of the 2's complement notation of Equation (8):

$$z_R = \tfrac{1}{2}\left[-a_{R0} + \sum_{n=1}^{N-1} a_{Rn} 2^{-n}\right] - \tfrac{1}{2}\left[-\bar{a}_{R0} + \sum_{n=1}^{N-1} \bar{a}_{Rn} 2^{-n} + 2^{-(N-1)}\right] \tag{11}$$

where
$a_{R0}$ = sign bit
$\bar{a}_{R0}$ = complement of the sign bit, $a_{R0}$
N = wordsize (number of bits)
n = 0, corresponds to the sign bit, $a_{R0}$ Rewriting Equation (11) by combining all coefficients of $2^{-n}$:

$$z_R = \tfrac{1}{2}\left[-(a_{R0} - \bar{a}_{R0}) + \sum_{n=1}^{N-1}(a_{Rn} - \bar{a}_{Rn}) 2^{-n} + 2^{-(N-1)}\right] \tag{12}$$

By similarly expanding the term $z_I$ in like manner and substituting the 2's complement notation of Equation (9) an alternate expression is obtained for $z_I$ (corresponding to that of Equation (12) for $z_R$):

$$z_I = \tfrac{1}{2}\left[-(a_{I0} - \bar{a}_{I0}) + \sum_{n=1}^{N-1}(a_{In} - \bar{a}_{In}) 2^{-n} + 2^{-(N-1)}\right] \tag{13}$$

Recalling from FIG. 2 that $y = wz$, and explicity performing the multiplication indicated above in Equation (6)

$$y = (w_R z_R - w_I z_I) + j(w_I z_R + w_R z_I) \tag{14}$$

Substituting the 2's complement notation of Equations (12) and (13) for $z_R$ and $z_I$, respectively, in Equation (14), and multiplying by the factor 2, and collecting the real terms apart from the imaginary terms of the complex product, wz (beginning with the factor, $2^{-(N-1)}$):

$$2y - (w_R - w_I) 2^{-(N-1)} - [(a_{R0} - \bar{a}_{R0})w_R - (a_{I0} - \bar{a}_{I0})w_I] + \sum_{n=1}^{N-1}[(a_{Rn} - \bar{a}_{Rn})w_R - (a_{In} - \bar{a}_{In})w_I] 2^{-n} + \tag{14a}$$

$$j\left((w_R + w_I) 2^{-(N-1)} - [(a_{R0} - \bar{a}_{R0})w_I + (a_{I0} - \bar{a}_{I0})w_R] + \sum_{n=1}^{N-1}[(a_{Rn} - \bar{a}_{Rn})w_I + (a_{In} - \bar{a}_{In})w_R] 2^{-n}\right)$$

Such expanded and rescaled expression for y corresponds to the form of Equation (7):

$$2y = 2y_R + j2y_I \tag{15}$$

Separately equating the real and imaginary terms of Equations (14a) and (15):

$$2y_R = (w_R - w_I) 2^{-(N-1)} + \sum_{n=0}^{N-1} q_{R,n}(a_{Rn}, a_{In}) 2^{-n} \tag{16a}$$

$$2y_I = (w_R + w_I) 2^{-(N-1)} + \sum_{n=0}^{N-1} q_{I,n}(a_{Rn}, a_{In}) 2^{-n} \tag{16b}$$

where:
$q_{R,0} = -[(a_{R0} - \bar{a}_{R0})w_R - (a_{I0} - \bar{a}_{I0})w_I]$   $n = 0$
$q_{R,n} = [(a_{Rn} - \bar{a}_{Rn})w_R - (a_{In} - \bar{a}_{In})w_I]$   $n \neq 0$
$q_{I,0} = -[(a_{I0} - \bar{a}_{I0})w_R - (a_{R0} - \bar{a}_{R0})w_I]$   $n = 0$
$q_{I,n} = [(a_{Rn} - \bar{a}_{Rn})w_I + (a_{In} - \bar{a}_{In})w_R]$   $n \neq 0$ The several resultant values for the kernels $q_{R,n}$ and $q_{I,n}$ associated for the binary values of $a_{Rn}$ and $a_{In}$ (where $n \neq 0$) are thus discovered to be:

TABLE I

| $a_{Rn}$ | $a_{In}$ | $q_{R,n}$ (n ≠ 0) | $q_{I,n}$ (n ≠ 0) |
|---|---|---|---|
| 0 | 0 | $-(w_R - w_I)$ | $-(w_R + w_I)$ |
| 0 | 1 | $-(w_R + w_I)$ | $+(w_R - w_I)$ |
| 1 | 0 | $+(w_R + w_I)$ | $-(w_R - w_I)$ |
| 1 | 1 | $+(w_R - w_I)$ | $+(w_R + w_I)$ |

For the case, n = 0, it may be demonstrated that the algebraic signs or senses of $q_{R,n}$ and $q_{I,n}$ are merely reversed.

In other words, it is to be appreciated that in the mechanization of the complex multiplication indicated by Equations (16a) and (16b) the two (scalar) components thereof, $2y_R$ and $2y_I$, may be achieved by two "q" registers and the storage of the scalar coefficients $(w_R + w_I)$ and $(w_R - w_I)$, as shown more particularly in FIG. 4.

Referring now to FIG. 4, there is illustrated in partial block diagram form an exemplary digital mechanization of the device of FIG. 2 which by repetitive performance of binary arithmetic performs the operation indicated by FIG. 3. There are provided registers or buffer storage or other sources 21, 22, 23 and 24 of the scalar magnitudes of the components of the complex values, $u = u_R + ju_I$ and $v = v_R + jv_I$, elements 24 and 22 corresponding to the scalar values of $u_R$ and $u_I$, respectively; and elements 23 and 21 corresponding to the scalar values of $v_R$ and $v_I$, respectively. There are also provided algebraic combining means 25, 26, 27 and 28 for subtractively or additively combining the subject scalar values stored in elements 21, 22, 23 and 24 in accordance with the relationships of Equations (2) and (4). For example, digital combining means 27 additively combines the values $u_R$ and $v_R$ to provide the value $x_R$ to register 42 and corresponding to the real component of the complex number, x. Similarly, digital combining means 25 additively combines the scalar values $u_I$ and $v_I$ to provide the value $x_I$ to register 41 and corresponding to the scalar value of the imaginary component of the complex number x.

By means of digital combining element 28, the values $u_R$ and $v_R$ are subtractively combined to provide the scalar value $(u_R - v_R)$ (of Equation (4)) for the real component $z_R$ of Equation (5). Similarly, digital combining means 26 subtractively combines the values $u_I$ and $v_I$ to provide the scalar value $(u_I - v_I)$ (of Equation (4)) for the imaginary component $z_I$ of Equation (5).

The respective scalar values from algebraic combining means 26 and 28, which represent the complex number $z_R + jz_I$ in serial binary data form, correspond to the series $a_{Rn}$ and $a_{In}$, respectively. Such binary data series are employed by three Exclusive-NOR gates 29, 30, and 31, comprising a portion of complex multiplier 32. Such complex multiplier 32 also comprises a first and second shift-and-add registers 33 and 34 for accumulating the product in the fashion of a serial-parallel multiplication, employing 2's complement sign spreading; register 43 serving to accumulate the real components of the complex product wz, and register 44 accumulating the imaginary components of such complex product. Thus, the respective outputs from registers 43 and 44 represent the scalar values $y_R$ and $y_I$ respectively in Equation (7) above.

The mechanization of accumulating registers (i.e., adder-subtractors) 33 and 34 and the application thereof to serial-parallel multiplication is well understood in the art, as indicated in Chapter 5 of the above-noted text "Digital Signal Processing" by Peled and Liu, beginning at Section 5.2, Mechanization Alternatives of Array Multiplication. Accordingly, these elements are illustrated in block form only for convenience in exposition.

There is also provided in the arrangement for the complex multiplier 32 of FIG. 4, memory means 35 and 36 for storing the values $(w_R+w_I)$ and $(w_R-w_I)$ as derived from the complex twiddle factor $w=w_R+jw_I$. Double-pole, double throw switching means 37 is provided for connecting a signal input 38 of each of registers 33 and 34 to an output of a mutually exclusive one of the two memory means 35 and 36. Thus, in the illustrated 1-state of two-state switch 37 in FIG. 4, the signal input 38 of register 33 is responsively coupled to an output of memory 36 and the corresponding input of register 34 coupled to memory 35. In the 0-state of switch 37, register 33 would be coupled to memory 35 and register 34 coupled to memory 36.

The state of switch 37 is controlled by or is responsive to the state of gate 29. In other words as the serial bit data streams $a_{Rn}$ at the output of element 28 and the serial bit data streams $a_{In}$ at the output of element 26 are impressed on respective inputs of Exclusive NOR gate 29, a corresponding binary (1 or 0) state results at the output of gate 29, thereby determining the control state of switch 37 and consequently the digital input to each of registers 33 and 34 from memories 35 and 36.

For example, during the course of the two concomitantly applied serial binary data bits, the occurrence of a like (either "1" or "0") state on both inputs concurrently results in a "1" switching control state, while the occurrence of a "1" state on a mutually exclusive one of the two inputs results in a "0" switching state, corresponding to the following truth table:

TABLE II

| INPUT 1 | Exclusive NOR INPUT 2 | OUTPUT |
|---|---|---|
| 1 | 0 | 0 |
| 0 | 1 | 0 |
| 1 | 1 | 1 |
| 0 | 0 | 1 |

Thus, as each pair of bits of the two serial data streams is successively applied to gate 23, the state of switch 37 responsively corresponds.

Each of gates 30 and 31 is responsive to a mutually exclusive one of the outputs of algebraic combining means 26 and 28, a first input of gate 30 being coupled to the output of digital combining means 28 and a first input of gate 31 coupled to element 26. A second input of each of gates 30 and 31 is responsively coupled to a source (not shown) of a system clock signal $T_s$ corresponding to the system word time rate. $T_s$ is a "0" state until the sign bit appears on lines $a_{Rn}$ and $a_{In}$, at which time $T_s$ is a "1" state. $T_s$ is therefore seen to be the sign-bit timing pulse. The add/subtract control input 39 of each of accumulating registers 33 and 34 is coupled to an output of a mutually exclusive one of gates 30 and 31, the control input of register 33 being coupled to the output of gate 30 as to be responsive to the state of the serial binary data bit stream $a_{Rn}$, and the control input of register 34 being coupled to gate 31 as to be responsive to the state of binary data bit $a_{In}$. A "0" state on the add/subtract control line is an "add" instruction; a "1" state on the add/subtract control line is a "subtract" instruction.

In normal operation of the complex multiplier 32 of FIG. 4, registers 33 and 34 serve as the $q_R$ and $q_I$ registers respectively in Table I, above, while the cooperation of double-pole, double-throw switch 37 (including switching control stage 29) with memories 35 and 36 serves to apply the correct one of coefficients $(w_R-w_I)$ and $(w_R+w_I)$ to each of $q_R$ register 33 and $q_I$ register 34 in accordance with Truth Table II, while gates 30 and 31 apply the proper sense (or algebraic sign) of response of registers 33 and 34, respectively, to a respectively applied signal input (from memories 35 and 36) in accordance with Tables I and II. For example, as illustrated in FIG. 4, a "1" state of each of the $a_{Rn}$ and $a_{In}$ inputs to gate 29 results in a "1" state output of gate 29, in accordance with the fourth set of conditions in Table I and the third set in Table II. Such "1" state of gate 29 and illustrated corresponding "1" state of switch 37, results in the coefficient $(w_R-w_I)$ being fed from memory 36 to $q_R$ register 33, and the coefficient $(w_R+w_I)$ being fed from memory 35 to $q_I$ register 34. Such "1" state of the $a_{Rn}$ bit input to gate 30 (from element 28) in conjunction with a "1" state clock input $T_s$ (corresponding to the $n=0$ case) will produce a "1" state output at gate 30 and a corresponding control state $(-)$ at $q_R$ register 33. Thus, the input to register 33 is $-(w_R-w_I)$. Similarly, the "1" state of the $a_{In}$ bit input to gate 31 (from element 26) in conjunction with a "1" state clock input $T_s$ produces a "1" state output at gate 31 and a corresponding control state $(-)$ at $q_I$ register 34. Thus, the input to register 34 is $-(w_R+w_I)$. Accordingly, it is to be appreciated that the foregoing description of logic states "1" for gates 29, 30 and 31 corresponds to the fourth condition described by the bottom line of Table II, and the respective values $y_R$ and $y_I$ appear at registers 43 and 44, respectively.

By similarly analyzing the effects of alternate sets of conditions or binary states of $a_{Rn}$ and $a_{In}$ (in FIG. 4), corresponding to the remaining three sets thereof illustrated in Table II, it can be conveniently demonstrated that resultant respective states of $q_R$ register 33 and $q_I$ register 34 in FIG. 4 (from memories 35 and 36) are in accordance with Table I. Accordingly, it is to be appreciated that the arrangement within block element 32 of FIG. 4 mechanizes the relationship of Table I as to represent a complex multiplier for the multiplication of complex numbers $w=w_R+jw_I$ and $z=z_R+jz_I$, to form the complex product, $wz=y_R+jy_I$, the value $y_R$ being stored in register 43 and the value $y_I$ in register 44.

The data in the $(w_R \mp w_I)$ registers 35 and 36 is determined as follows:

$$w = e^{-j\theta} = w_R + jw_I \quad (17)$$
$$w_R = \cos\theta \quad (18A)$$

-continued $$w_I = \sin \theta \quad (18B)$$

$$w_R \mp w_I = \cos \theta \mp \sin \theta = \cos \theta \mp \cos\left(\frac{\pi}{2} - \theta\right) \quad (19)$$

Substituting the trignometric identities of Equations 596 and 597 from "A Short Table of Integrals" by B. O. Peirce, published by the Athenian Press, Ginn and Company (1929), for the sum and difference, respectively, of the cosine functions:

$$w_R + w_I = \cos \theta + \cos\left(\frac{\pi}{2} - \theta\right) \quad (20A)$$

$$w_R + w_I = 2 \cos \tfrac{1}{2}\left(\theta + \frac{\pi}{2} - \theta\right) \cdot \cos \tfrac{1}{2}\left(\theta - \frac{\pi}{2} + \theta\right) \quad (20B)$$

$$w_R + w_I = 2 \cos \frac{\pi}{4} \cos\left(\theta - \frac{\pi}{4}\right) = \frac{2}{\sqrt{2}} \cos\left(\theta - \frac{\pi}{4}\right) \quad (21)$$

$$\mp(w_R + w_I) = \sqrt{2} \cos\left(\theta - \frac{\pi}{4}\right) \quad (22)$$

$$w_R - w_I = \cos \theta - \cos\left(\frac{\pi}{2} - \theta\right) \quad (23A)$$

$$w_R - w_I = -2 \sin \tfrac{1}{2}\left(\theta + \frac{\pi}{2} - \theta\right) \cdot \sin \tfrac{1}{2}\left(\theta - \frac{\pi}{2} + \theta\right) \quad (23B)$$

$$w_R - w_I = -2 \sin \frac{\pi}{4} \sin\left(\theta - \frac{\pi}{4}\right) = \quad (24)$$

$$\frac{-2}{\sqrt{2}} \cos\left(\theta - \frac{\pi}{4} + \frac{\pi}{2}\right)$$

$$\mp(w_R - w_I) = \sqrt{2} \cos\left(\theta + \frac{\pi}{4}\right) \quad (25)$$

Therefore:

$$+(w_R + w_I) = +\sqrt{2} \cos\left(\theta \pm \frac{\pi}{4}\right) \quad (26)$$

Thus, it is to be appreciated that the pair of factors $\mp(w_R \mp w_I)$ may be represented as sets of phase shifted cosine factors, to be stored in ROM's 35 and 36.

Because the coefficients stored in the read-only memories are $(w_R + w_I)$ and $(w_R - w_I)$, rather than $w_R$ and $w_I$, the simplified mechanization of FIG. 4 results. Such FFT butterfly architecture (for the decimation-in-frequency case) lends itself to mechanization of a simplified computation "chip", in which the simplified "on-chip" computation is supported by off-chip memories, and the number of chip interface connections reduced by means of inclusion of a parallel data bus, as shown in FIG. 5.

Referring to FIG. 5, there is illustrated an alternate arrangement of the embodiment of FIG. 4 and representing an "on-chip" computation, responsive to "off-chip" memory by means of a 16-line parallel data bus 50. In other words, no more than sixteen (16) pin connections are required to accommodate the ingress of data to and the egress of data from the circuit chip of FIG. 5, all data moving in multiplexed parallel binary form via bus 50. Cooperating with parallel bus 50 are parallel-to-serial input registers 21, 22, 23, 24, 35 and 36 for time-buffering and reformatting (from parallel-to-serial binary data stream), as is well understood in the digital data-processing art.

There is also provided in the arrangement of FIG. 5, a decoder 132 (corresponding to gates 29, 30 and 31 of FIG. 4) in cooperation with multiplex 137 (corresponding to switching means 37 of FIG. 4) and complementers to permit subtraction. Multiplex 137, in turn, cooperates with a first and second shift-and-add element 133 and 134, as to effect the function of accmulating registers 33 and 34 in FIG. 4. There is further provided in the arrangement of FIG. 5 serial-to-parallel output registers 41 and 42 for time-buffering and reformatting (from serial to parallel binary data format) for compatibility with parallel data bus 50, as is well understood in the art. Registers 43 and 44 are parallel (input/output) in form, the sixteen (16)-line (parallel) conversion from a serial data stream having been made by the respective one of shift-and-adders 133 and 134 cooperating therewith.

Figures 6, 7:
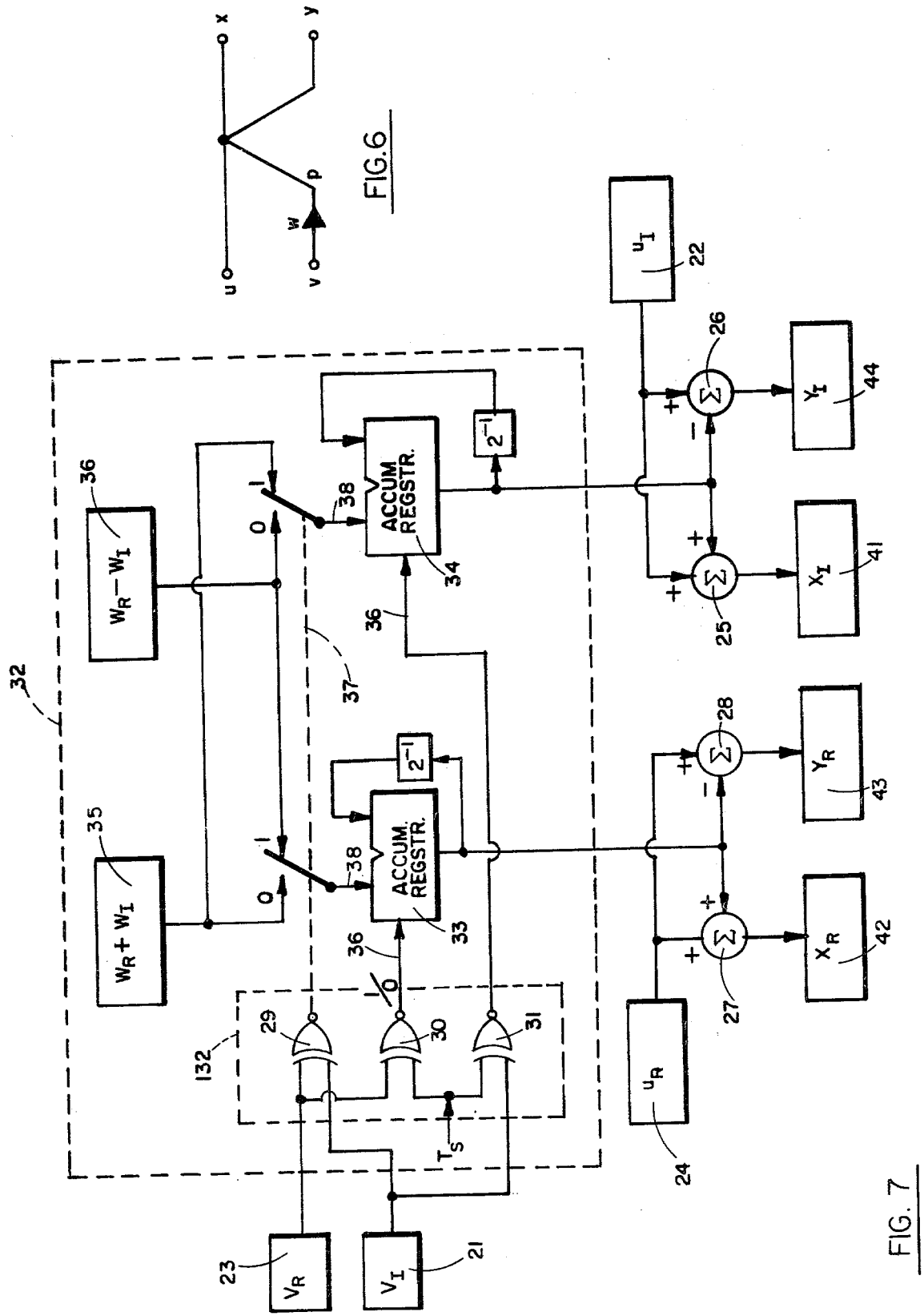
FIG. 6 is a diagram of a single decimation-in-time type FFT butterfly arithmetic unit.
FIG. 7 is a functional block diagram of an alternate arrangement of the organization of FIG. 4, employing the decimation-in-time type butterfly arithmetic of FIG. 6.

Although the concept of the invention has been thus far disclosed as a novel mechanization for a complex multiplier as applied to a decimation-in-frequency type of FFT, the concept is not so limited and may be applied to a decimation-in-time type FFT, as shown in FIGS. 6 and 7.

Referring to FIG. 6, there is illustrated an exemplary decimation-in-time type FFT computation butterfly, the butterfly equations for which are:

|  |  | $x = u + vw$ | (27) |
|---|---|---|---|
|  |  | $y = u - vw$ | (28) |
| Letting |  | $p = vw$ | (29) |
| Then, |  | $x = u + p$ | (30) |
|  |  | $y = u - p$ | (31) | which decimation-in-time equation set (Equations (30) and (31)) is similar in form to the decimation-in-frequency set of Equations (1) and (3), while the above expression for the term p in Equation (29) is similar to Equation (6) for y. Accordingly, complex multiplier 32 of FIG. 6, employing the sums and difference $\mp(w_R \mp w_I)$ of the components of the complex weighting function or twiddle factor W shown in FIG. 6 may be arranged to cooperate in the decimation-in-time FFT mechanization of FIG. 7.

Referring now to FIG. 7, there is schematically illustrated in partial block diagram form the organization of a decimation-in-time type FFT, in which the concept of the invention is advantageously employed as an alternate arrangement to the decimation-in-frequency arrangement of FIG. 4. Such mechanization for Equations (30) and (31) in FIG. 7 may be observed to be substantially similar to that of the decimation-in-frequency machine of FIG. 6, the decoder section 132 (gates 29, 30 and 31) being driven by the variable $v = v_R + jv_I$ (rather than z) and the contents of the accumulators 33 and 34 being $p_R$ and $p_I$, respectively, (rather than $y_R$ and $y_I$). In other words, the respective multiplication functions performed by complex multiplier 32 in FIGS. 4 and 7, respectively, are as set forth in the following table:

TABLE III

| DECIMA-TION | ACCUMULATOR CONTENT | DECODER DRIVEN BY | CO-EFFICIENT |
|---|---|---|---|
| In frequency | y | z | $w_R \mp w_I$ |
| In time | p | v | $w_R \mp w_I$ |

Completing the mechanization in FIG. 7 are two sets of digital combining means (first set 27 and 28, and second set 25 and 26), each set comprising digital additive combining means and digital subtractive combining means, each set responsive to a mutually exclusive one of the two accumulators. Each of digital combiners 27 and 28 has a first input responsive to a register or source of the value $u_R$ and a second input responsive to the $p_R$ output of accumulator 33, element 27 additively combining the applied inputs to provide the output $x_R$, corresponding to the magnitude of the real component of Equation (30). Element 28 subtractively combines the applied inputs to provide the output $y_R$, corresponding to the magnitude of the real component of Equation (31).

Each of digital combiners 25 and 26 has a first input responsive to a register or source 22 of the value $u_I$ and a second input responsive to the $p_I$ output of accumulator 34, element 25 additively combining the applied inputs to provide the output $x_I$, corresponding to the magnitude of the imaginary component of Equation (30). Element 26 subtractively combines the applied inputs to provide the output $y_I$, corresponding to the magnitude of the imaginary component of Equation (31).

Although the decimation-in-frequency embodiment in FIG. 5 (for the general organization of FIG. 4) has been described as employing a parallel transport (or parallel input/parallel output) mechanization, the concept of the invention is not so limited and it is to be understood that such parallel data transport type mechanization may also be applied to embodiments of the decimation-in-frequency type organization of FIG. 7. Further, although a detail mechanization of the decimation-in-frequency and decimation-in-time organizations of FIGS. 4 and 7, respectively, has been described in terms of parallel data transport, the concept of the invention may also be applied to serial data transport (serial input/serial output) mechanizations, as shown in FIGS. 8 and 9.

Figure 8:
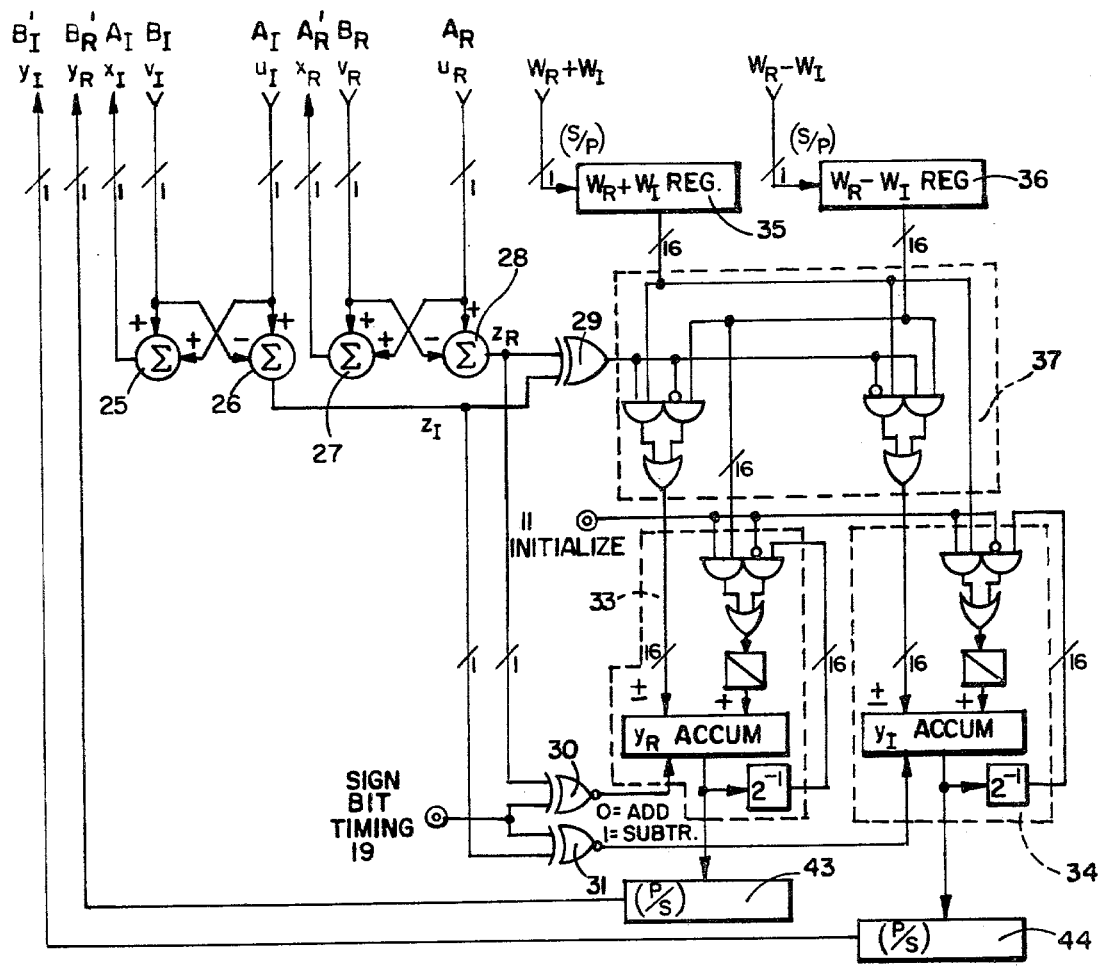
FIG. 8 is a serial input, serial output embodiment of the arrangement of FIG. 4.
Figure 9:
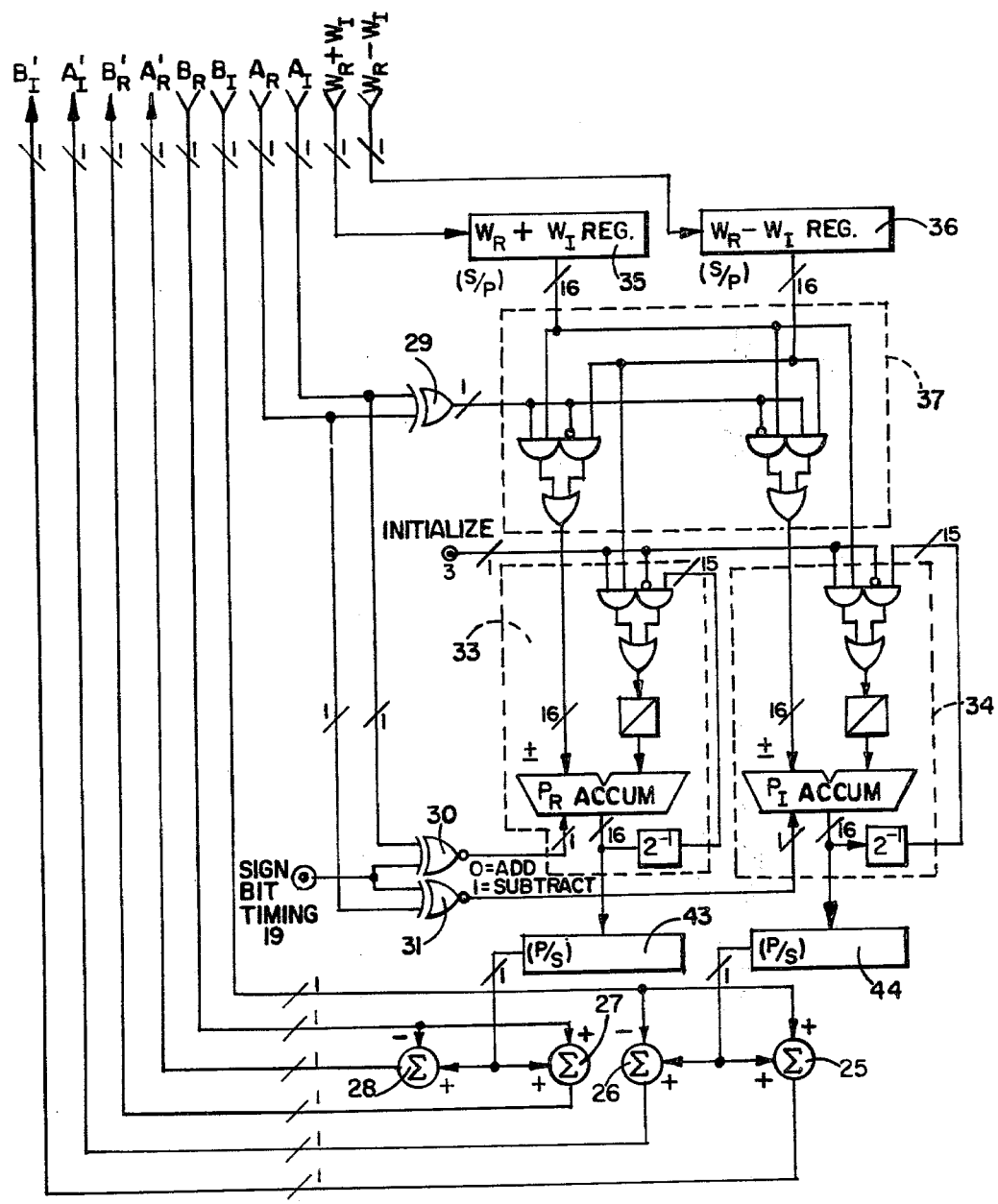
FIG. 9 is a serial input, serial output embodiment of the arrangement of FIG. 7.

Referring now to FIGS. 8 and 9, there are illustrated a respective decimation-in-frequency and decimation-in-time type FFT mechanization of the general arrangements of FIGS. 4 and 7, respectively. Each of the mechanizations of FIGS. 8 and 9 employs a serial input/serial output (i.e., serial data transport) type configuration, with a consequent reduction in the number of input registers required, namely the omission of input registers 21, 22, 23 and 24 and output registers 41 and 42 of FIGS. 4 and 7. In addition, the serial data transfer, decimation-in-time FFT mechanization of FIG. 9 also avoids the use of output registers 43 and 44. However, such serial data transfer mechanizations yet retain a high data processing rate, the butterfly arithmetic computation bit time being $1+\max(M,N)$ (when M=bit word size of factor W, and N=bit word size of the coefficient to be multiplied), as compared to the processing time of $6M+8N+4$ for the serial data transport arrangement of Shapiro's decimation-in-time mechanization, which advantage arises from the novel arrangement of the complex multiplier disclosed herein, including the processing of the complex coefficient, W.

Hence, it is to be appreciated that there has been described decimation-in-frequency and decimation-in-time type FFT machines embodying the complex-multiplier concept of the invention, and that such concept comprises novel and highly advantageous means for mechanizing a multiplier for the multiplication of sets of complex numbers.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a digital-data processor for sampling the time history of a time-varying signal as an input time series to determine the fourier coefficients of an equivalent fast fourier transform (FFT) of said time history, high-speed means for performing the fast fourier transform butterfly arithmetic and comprising:
   a pair of storage means, each for storing a respective one of the sums ($W_R+W_I$) and the differences ($W_R-W_I$) of the complex FFT butterfly weighting coefficients $W_R$ and $W_I$ as sets of phase-shifted cosine values;
   a pair of selectively additive and subtractive accumulating registers, each selectively responsive to an alternative one of said sums and differences of said weighting coefficients stored in said pair of storage means; and
   exclusive-NOR logic switching means responsive to preselected state conditions of a sampled epoch input to said butterfly arithmetic unit for preselectively controlling said pair of accumulating registers whereby a respective component of the complex weighted butterfly output function occurs at the output of a respective one of said accumulating registers in response to the applied sums and differences of said complex butterfly weighting coefficients.

2. The device of claim 1 in which said exclusive NOR logic switching means comprises:
   a first exclusive NOR gate switch for switchably connecting the inputs of said accumulating registers of said register pair to mutually exclusive ones of said storage means on alternate switching states of said switching means;
   a second exclusive NOR gate responsive to a preselected binary state of the resolved real or reference component of the applied complex inputs to said butterfly arithmetical unit, for control of the add-/subtract state of one register of said pair of accumulating registers; and
   a third exclusive-NOR gate responsive to a preselected binary state of the resolved quadrature component of said applied complex inputs to said arithmetical unit, for control of the add/subtract state of the second register of said register pair.

3. Digital processing means for performing the product of two complex numbers and comprising:
   memory means having a first and second output line corresponding to a scalar sum and difference respectively of a pair of values, $W_R$ and $W_I$, corresponding to the magnitude of the real and imaginary components of W, one of the complex numbers;
   first and second accumulators, each having a signal input, a control input, a signal output and a signal-scaling feedback responsively coupled to said output, each of said signal inputs of said accumulators being responsively coupled to a mutually exclusive one of said outputs of said memory means;
   first two-state control logic means for switching said signal inputs of said accumulators to alternative ones of said mutually exclusive outputs of said memory means in response to a preselected signal state of two component signals representing a complex signal applied to respective ones of two inputs of said first logic means; and
   second and third two-state logic control means, each coupled to a mutually exclusive one of the two inputs of said first logic control means for providing an add/subtract control mode input to the control input of a mutually exclusive one of said two accumulators, whereby the output of each of said accumulators corresponds to a preselected one of the two components of said product of complex numbers.

4. The device of claim 3 in which:
said first and second inputs of said first control logic means corresponds to a serial bit of a respective real and imaginary component of a serial binary complex digital input $a_{Rn} + ja_{In} = A_n$, and
the respective outputs of each of said accumulators corresponds to a respective real and imaginary component of the complex product Aw of the complex numbers A and w, and formed according to the following truth table:

| $a_R$ | $a_I$ | $[q_R]$ | $[q_I]$ |
|---|---|---|---|
| 0 | 0 | $-(W_R - W_I)$ | $-(W_R + W_I)$ |
| 0 | 1 | $-(W_R + W_I)$ | $+(W_R - W_I)$ |
| 1 | 0 | $+(W_R + W_I)$ | $-(W_R - W_I)$ |
| 1 | 1 | $+(W_R - W_I)$ | $+(W_R + W_I)$ | where $q_R$ = the input (including add/subtract state) of said first accumulator
where $q_I$ = the input (including add/subtract state) of said second accumulator.

5. The device of claim 3 in which there is further provided a first and second set of algebraic combining means respectively responsive to a mutually exclusive one of said outputs of said two accumulators and responsive to a corresponding and mutually exclusive one of a real and imaginary component of a complex second signal, B, for providing the real and imaginary components of the weighted complex products A' and B' of a decimation-in-time FFT butterfly computation.

6. The device of claim 3 in which there is further provided a set of first and second subtractive combining means, each having an output coupled to a mutually exclusive one of the inputs of said first two-state control logic means, said first subtractive combining means responsive to the real components of a first and second half, A and B, of a sampled epoch, and the second subtractive combining means adapted to be responsive to the imaginary components of said A and B samples of said sampled epoch, whereby the complex number output of one of said accumulators corresponds to the complex product B' = zW of a decimation-in-frequency FFT butterfly computation where z = A − B.

7. Digital processing means for performing the product of complex numbers and comprising:
memory means having a first and second output line corresponding to a scalar sum and difference respectively of a pair of values, $W_R$ and $W_I$ of the complex number $W = W_R + jW_I$;
first and second two's complement accumulators, each having a signal input, a sign control input, and a signal output;
first two-state control logic means for switching said signal inputs of said accumulators to alternative ones of said mutually exclusive outputs of said memory means in response to a preselected signal state of two digital component signals representing a complex signal applied to respective ones of the two inputs of said first logic means; and
second and third two-state logic control means, each coupled to a mutually exclusive one of the two inputs of said first logic control means for providing an add/subtract control mode input to the control input of a mutually exclusive one of said two accumulators.

8. In a signal processor for performing a discrete fast fourier transform on signals (representing complex numbers) submitted to such processing, apparatus for repetitively performing the algebraic sum of AW and B, where A is one portion of such signals, W is a complex weighting factor, and B is a second portion of such signals, such apparatus comprising:
memory means for storing the magnitude values $(W_R + W_I)$ and $(W_R - W_I)$, where $W_R$ is the magnitude of one component of the complex weighting factor W and $W_I$ is the magnitude of the other component of such weighting factor, said two stored values being available as outputs on mutually exclusive output lines of said memory means;
first and second accumulator means for providing a respective first and second output indication of a first and second component respectively of a complex product of said A signal portion and said complex weighting factor W;
double-pole, double-throw switching means for responsively connecting a signal input of each of said accumulator means to a mutually exclusive one of said outputs of said memory means, said switching means including a switching control input stage responsive to an alternative one of the components of an applied signal for synchronously switching said inputs of said two accumulator means between corresponding alternative ones of said outputs of said memory; and
first and second logic control means, each responsive to a mutually exclusive one of said components of an applied signal for switching a mutually exclusive one of said accumulators to an alternative one of a respective subtractive and additive state.

9. A decimation-in-frequency type periodic-function transform machine for sampling the time history sequence or batch of a time-varying signal as an input time series to determine the coefficients of an equivalent periodic function transform of said batch and comprising:
first and second registers for storing signals indicative of the successive samples of a respective one of a real component ($u_{RN}$) and time phase quadrature component ($u_{IN}$) of a first half N/2 of said batch N of successive samples;
third and fourth registers for storing signals indicative of the successive samples of a respective one of real components ($v_{RN}$) and a time phase quadrature component ($v_{IN}$) of a second half of said batch N of successive samples;
said first and third registers forming a first pair of registers of the respective components $u_R$ and $v_R$ and said second and fourth registers forming a second pair of registers of the respective components $u_I$ and $v_I$;
first and second arithmetic combining means each responsive to a mutually exclusive one of said two pairs of registers, said first combining means providing an output indicative of the sum ($x_R = u_R + v_R$) and said second combining means providing an output indicative of the sum ($x_I = u_I + v_I$) to respective ones of an $x_R$ and $x_I$ register;
third and fourth arithmetic subtractively combining means, each responsive to a mutually exclusive one of said two pairs of registers, said third combining means providing an output indicative of the difference ($z_R = u_R - v_R$) of said fourth combining means providing an output indicative of the difference ($z_I = u_I - v_I$);

a pair of fourier transform weighting function registers for storing phase-shifted cosine values $W_R$ and $W_I$ of the FFT computation, a first weighting function register of said pair storing the sum ($W_R + W_I$) and a second one storing the difference ($W_R - W_I$);

first and second selectively additive and subtractive accumulating registers each switchably connected to a mutually exclusive alternative one of said weighting function registers, each of said accumulating registers having an add/subtract control input;

a first exclusive NOR gate switching means responsive to a preselected state condition of the applied complex inputs (u and v) for switchably connecting the inputs of said accumulating registers to mutually exclusive alternative ones of said weighting function registers on alternate switching states of said switching means;

a second exclusive NOR gate responsive to a preselected state ($u_R - v_R$) of the resolved real or reference component of said applied complex inputs to said arithmetic unit, for control of the add/subtract state of one register of said pair of accumulating registers; and a third exclusive-NOR gate responsive to a preselected state ($u_I - v_I$) of the resolved quadrature component of said applied complex inputs, for control of the add/subtract state of the other register of said pair of accumulating registers.

* * * * *

UNITED STATES PATENT AND TRADEMARK OFFICE
CERTIFICATE OF CORRECTION

PATENT NO. : 4,275,452
DATED : June 23, 1981
INVENTOR(S) : Stanley A. White

It is certified that error appears in the above-identified patent and that said Letters Patent are hereby corrected as shown below:

Column 15, line 14, (in the heading of the fourth column of the table) correct "$[q_r]$" to read ---$[q_I]$---; line 54, correct "$W = W_R + jW_r$" to read ---$W = W_R + jW_I$---.

Column 16, line 18, correct "indication" to read ---indicative---; line 57, correct "$v_r$" to read ---$v_I$---.

Signed and Sealed this

*Fifteenth* Day of *September 1981*

[SEAL]

*Attest:*

*Attesting Officer*

GERALD J. MOSSINGHOFF

*Commissioner of Patents and Trademarks*